(12) United States Patent
Momtahan

(10) Patent No.: US 8,546,741 B2
(45) Date of Patent: Oct. 1, 2013

(54) COMPACT OPTICAL FINGER NAVIGATION SYSTEM BASED ON SPECKLES WITH AN OPTICAL ELEMENT INCLUDING AN OPTICAL REDIRECTION SURFACE

(75) Inventor: Omid Momtahan, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 444 days.

(21) Appl. No.: 13/006,299

(22) Filed: Jan. 13, 2011

(65) Prior Publication Data

US 2012/0181419 A1    Jul. 19, 2012

(51) Int. Cl.
G06M 7/00    (2006.01)
H01J 3/14    (2006.01)
G06F 3/041    (2006.01)
G06F 3/042    (2006.01)

(52) U.S. Cl.
USPC ............ 250/221; 250/216; 345/173; 345/176

(58) Field of Classification Search
USPC .............. 250/221, 208.1, 216, 227.2, 237 R, 250/239, 203.1, 203.2, 227.11, 229, 559.29, 250/559.07, 559.4, 227.22, 227.24; 382/124, 382/126, 127, 103, 107; 348/169; 345/157, 345/173, 175, 176, 166, 163, 158; 356/614, 356/615
See application file for complete search history.

(56) References Cited

U.S. PATENT DOCUMENTS

| | | | |
|---|---|---|---|
| 6,677,929 B2 | 1/2004 | Gordon et al. | |
| 6,872,931 B2 | 3/2005 | Liess et al. | |
| 6,927,758 B1 * | 8/2005 | Piot et al. | 345/166 |
| 7,065,258 B2 * | 6/2006 | Nahum | 382/278 |
| 7,205,521 B2 * | 4/2007 | Gruhlke et al. | 250/206.2 |
| 7,221,356 B2 * | 5/2007 | Oliver et al. | 345/166 |
| 7,313,255 B2 | 12/2007 | Machida et al. | |
| 7,732,752 B2 * | 6/2010 | Mathis et al. | 250/221 |
| 7,737,959 B2 * | 6/2010 | Gruhlke et al. | 345/176 |
| 2004/0208348 A1 | 10/2004 | Baharav et al. | |
| 2008/0123106 A1 * | 5/2008 | Zeng et al. | 356/600 |
| 2008/0174782 A1 * | 7/2008 | Lin | 356/500 |
| 2010/0071967 A1 | 3/2010 | Lee et al. | |
| 2010/0079408 A1 | 4/2010 | Leong et al. | |
| 2010/0079411 A1 | 4/2010 | Lee et al. | |
| 2010/0128003 A1 | 5/2010 | Orsley | |

* cited by examiner

*Primary Examiner* — Que T Le
*Assistant Examiner* — Jennifer Bennett

(57) ABSTRACT

An optical finger navigation device includes an image sensor, a tracking surface, and an optical element. The image sensor generates an image representative of light detected at a pixel array that has a pixel pitch which at least partially defines a surface area of a pixel. The tracking surface is approximately parallel to the image sensor. A first distance between and substantially orthogonal to planes of the tracking surface and the image sensor is insufficient under a set of illumination constraints to produce at the image sensor a speckle size above a threshold. The threshold is approximately one order of magnitude less than the pixel pitch. The optical element is interposed between the tracking surface and the image sensor. The optical element includes at least one optical redirection surface to redirect light along an optical path of a second distance between the tracking surface and the image sensor.

15 Claims, 6 Drawing Sheets

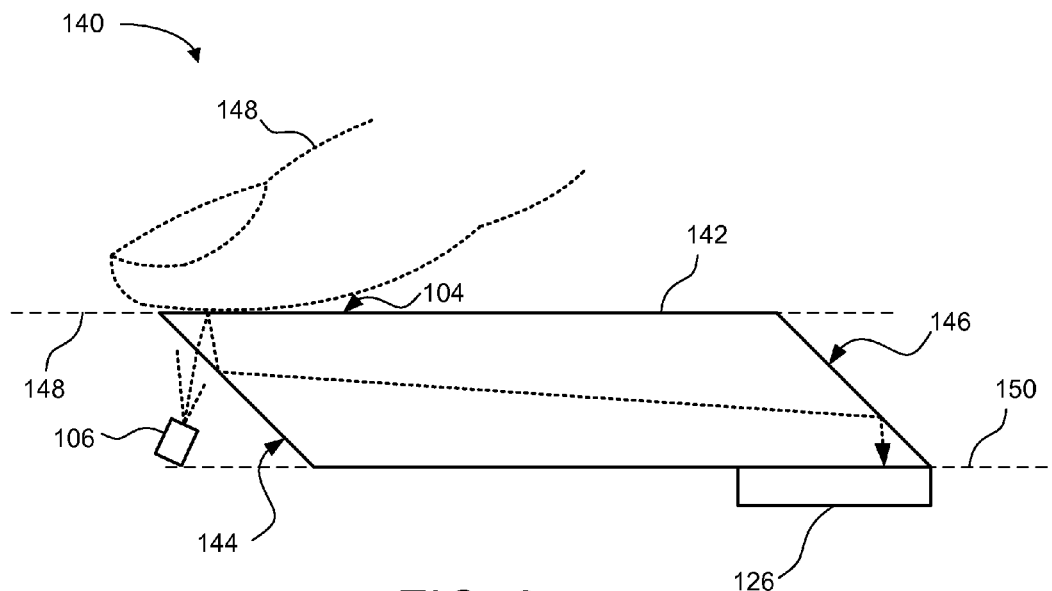
FIG. 2
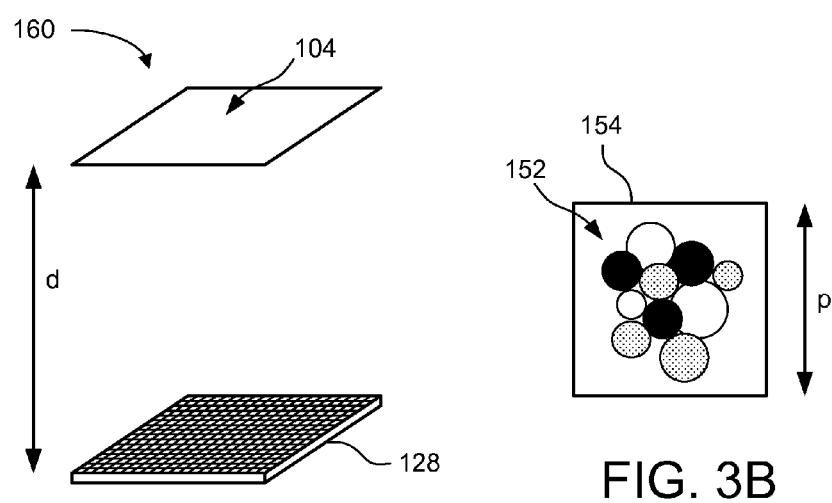
FIG. 3A
FIG. 3B

COMPACT OPTICAL FINGER NAVIGATION SYSTEM BASED ON SPECKLES WITH AN OPTICAL ELEMENT INCLUDING AN OPTICAL REDIRECTION SURFACE

BACKGROUND

Optical finger navigation (OFN) sensors are used to sense relative movement of a user's finger. OFN sensors are mainly implemented using small lenses or optical imaging systems (lenses, prisms, and apertures). The current trend is to implement OFN sensors within devices that have relatively small form factors. However, the use of a small form factor results in design difficulties. For example, the requirements on the physical dimensions of the imaging system as a whole limit the overall size of the OFN sensors.

The source of light in many conventional sensors is incoherent illumination from a light-emitting diode (LED). Since the illumination source is incoherent, it is typically not possible to track the finger movement speckle patterns. Consequently, incoherent light sources are often used in combination with other optical elements (e.g., lenses, apertures, etc.). However, the use of these types of additional optical elements can increase the overall size of the OFN sensor, which is in conflict with the trend of reducing the overall size of devices that use OFN sensors.

Other conventional OFN sensors use coherent illumination, which facilitates the use of speckle patterns to track finger movement. The propagation of the coherent beam from different locations of a diffusing surface such as a tracking surface produces the speckle pattern on the detector even without the presence of any imaging optics. However, the use of coherent illumination is unsatisfactory in conventional thin OFN sensors, which have a total thickness of about 1 mm, because the resulting average speckle size is too small relative to the pixel pitch, or the size of the individual pixels, of the detector. The thickness of thin OFN sensors constrains the optical distance of the light path from the tracking surface to the pixel array and results in the relatively small speckles. As one example, for an optical distance of about 1 mm between the navigation surface and the detector array, the average speckle size is less than 1 µm for a circular illumination area with 1 mm diameter at an optical wavelength of 850 nm. If the detector array has a pixel pitch larger than 1 µm, then there is an averaging effect of the speckle pattern, which reduces the contrast of the speckle patterns. In general, the contrast is the ratio of standard deviation of the intensity on the detector surface over its mean. If the navigation device is capable of tracking based on a speckle pattern with a contrast of 10% or more, then the maximum size of the active area on each pixel is about 10 µm. However, this maximum pixel size is much smaller than commercially available and low cost sensors used in OFN devices. Conversely, if the same speckle pattern were detected by a detector array with larger pixels, then the averaging effect would lower the contrast below an acceptable level.

SUMMARY

Embodiments of a system are described. In one embodiment, the system is an optical finger navigation device. One embodiment of the optical finger navigation device includes an image sensor, a tracking surface, and an optical element. The image sensor generates an image representative of light detected at a pixel array that has a pixel pitch which at least partially defines a surface area of a pixel. The tracking surface is approximately parallel to the image sensor. A first distance between and substantially orthogonal to planes of the tracking surface and the image sensor is insufficient under a set of illumination constraints to produce at the image sensor a speckle size above a threshold. The threshold is approximately one order of magnitude less than the pixel pitch. The optical element is interposed between the tracking surface and the image sensor. The optical element includes at least one optical redirection surface to redirect light along an optical path of a second distance between the tracking surface and the image sensor. The second distance is sufficient under the set of illumination constraints to produce at the image sensor a speckle size of at least the threshold. Other embodiments of the system are also described. Embodiments of corresponding methods are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 2 depicts a schematic diagram of one embodiment of an optical navigation arrangement for use in the optical navigation system of FIG. 1.

FIG. 3A depicts a schematic diagram of one embodiment of a distance between the navigation surface and the image sensor.

FIG. 3B depicts a schematic diagram of one embodiment of a speckle pattern produced on a pixel of the image sensor.

Throughout the description, similar reference numbers may be used to identify similar elements.

DETAILED DESCRIPTION

Figure 1:
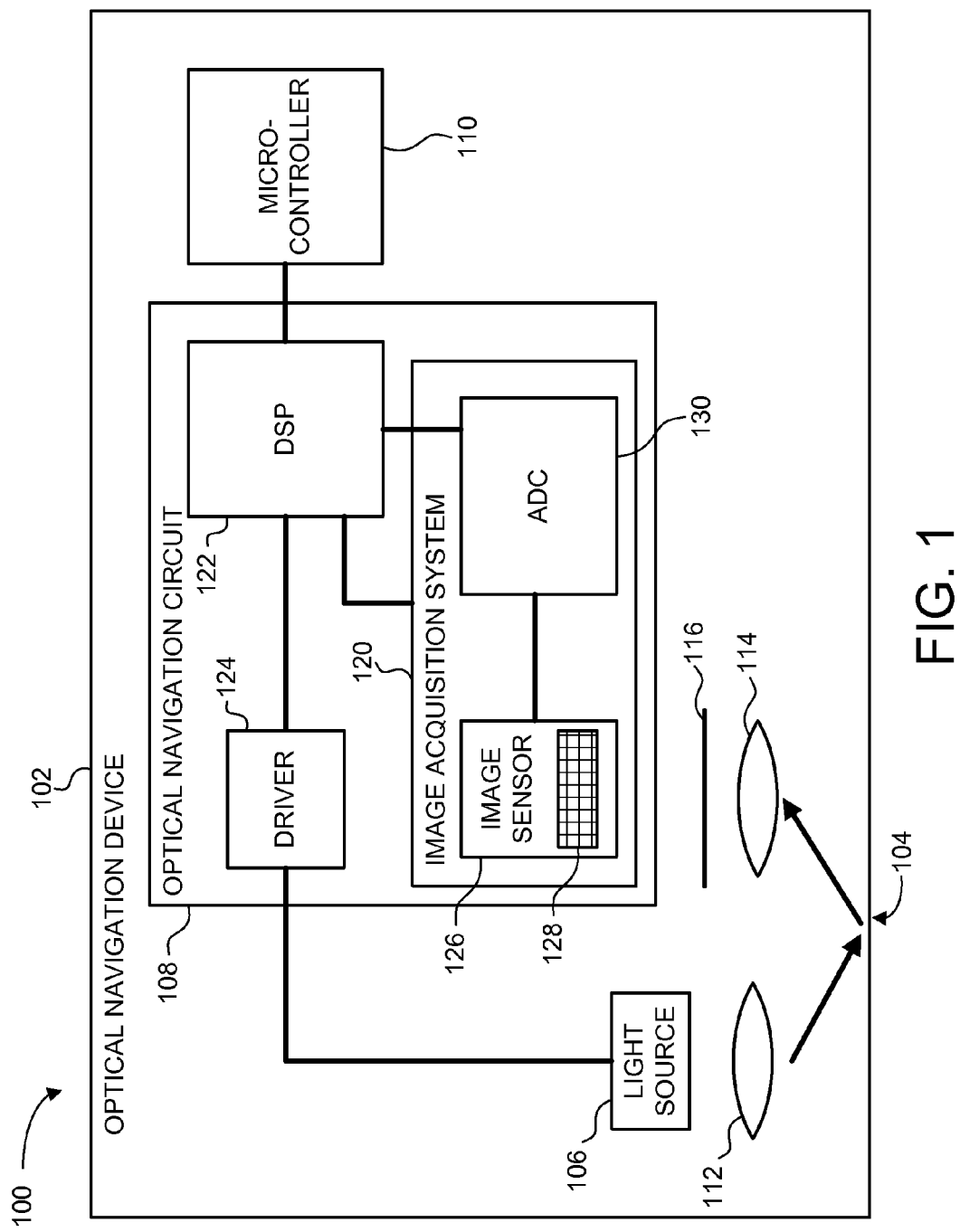
FIG. 1 depicts a schematic block diagram of one embodiment of an optical navigation system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments include optical navigation devices which can be implemented to use speckle patterns within very thin form factors. While the use of speckle patterns may dictate minimum thicknesses of conventional optical navigation devices (in order to match the optical path along the device thickness with image sensors which have adequately sized pixels), embodiments described herein can achieve much thinner form factors because the optical path can be lengthened independent of the device thickness. In specific embodiments, optical path of the device is lengthened through the use of an intermediate optical element that redirects the reflected light from a tracking surface toward the image sensor along a substantially transverse path relative to the thickness of the device. In some embodiments, the light is redirected along the dimension parallel to the navigation surface. Additional optical lenses such as those used in conjunction with incoherent light sources are not needed. Also, additional device thickness is not required to provide an optical path of adequate length to produce a speckle size that is sufficient for conventional image sensors with standard pixel dimensions. In this manner, embodiments of optical navigation devices may be implemented which are thinner than conventional devices and maintain a high level of accuracy.

The structural arrangement of components within embodiments described herein results in various potential advantages over conventional optical navigation devices. For example, some embodiments facilitate implementation of an optical finger navigation (OFN) device with a relatively smaller total thickness. Some embodiments simplify implementation and fabrication, for example, by omitting unnecessary optical elements. Some embodiments may be manufactured with lower cost. Some embodiments may be manufactured with less sensitivity to deviations in component tolerance or alignment. Other embodiments may exhibit a combination of these and/or other potential benefits over conventional devices and implementations.

FIG. 1 depicts a schematic block diagram of one embodiment of an optical navigation system 100. In general, the optical navigation system 100 is representative of one or more types of devices which are capable of implementing optical navigation functionality. As one example, the optical navigation system 100 may implement optical finger navigation functionality. Optical finger navigation functionality allows a user to move a finger on a navigation tracking surface in order to input information or control various aspects of a coupled device (e.g., to control a cursor on a display device). As another example, it may be possible to implement a version of the optical navigation system 100 to facilitate conventional mouse navigation functionality. Other embodiments of the optical navigation system 100 may implement other types of navigation functionality.

The illustrated optical navigation system 100 includes an optical navigation device 102 relative to a navigation surface 104. In some embodiments, the navigation surface 104 is coupled to the optical navigation device 102 so that movement of the optical navigation device 102 results in corresponding movement of the navigation surface 104. For example, a mobile telephone, personal digital assistant (PDA), or other computing device may have an integrated navigation surface 104 that is accessible on an exterior face of the device. In other embodiments, the navigation surface 102 is separate from the optical navigation device. For example, a desktop surface (or mousepad surface) may serve as the navigation surface 104 for an optical navigation device 102 implemented to perform conventional mouse navigation functionality.

In general, the optical navigation device 102 illuminates portions of the navigation surface 104 in order to generate images of the illuminated portions or features at the navigation surface 104. More specifically, the optical navigation device 102 illuminates relative movement at the navigation surface 104 and generates one or more navigation signals representative of the relative movement at the navigation surface 104. Hence, the navigation surface 104 also may be referred to as an illumination surface. Additionally, since the navigation surface 104 is used to track the movement of the optical navigation device 102, the navigation surface 104 also may be referred to as a tracking surface. In some embodiments, the relative movement is due to movement of a user's finger across the navigation surface 104. In other embodiment, the relative movement is due to movement of the optical navigation device 102 relative to a separate navigation surface 104 (e.g., desktop).

In order to illuminate the navigation surface 104, the optical navigation device 102 emits light which is at least partially reflected by the navigation surface 104. The optical navigation device 102 detects at least a portion of the reflected light and processes the detected portion to generate the navigation signals. Examples of how the navigation signals may be generated are described in more detail below.

The navigation surface 104 may be any type of surface and may include one or more types of material compositions. Examples of typical navigation surfaces 104 include transparent or semi-transparent plastic or glass, wood, stone, or plastic laminate desktops, as well as fabric or other textured navigation pads (e.g., a mouse pad).

In the arrangement where the navigation surface 104 is separate from the optical navigation device 102, the distance between the optical navigation device 102 and the navigation surface 104 may vary depending on the application for which the optical navigation device 102 is used. In surface navigation applications, the optical navigation device 102 may be relatively close to the navigation surface 104. For example, a housing of the optical navigation device 102 may be in direct, physical contact with the navigation surface 104. Alternatively, stand-off structures (not shown) attached to the housing of the optical navigation device 102 may be in direct, physical contact with the navigation surface 104. In other embodiments, the optical navigation device 102 may be within a few centimeters or inches of the navigation surface 104, without being in direct, physical contact with the navigation surface 104. In contrast, in free space navigation applications, the optical navigation device 102 may be relatively far from the navigation surface 104. For example, the optical navigation device 102 may operate outside of the surface navigation optical range.

The depicted optical navigation device 102 includes a light source 106, an optical navigation circuit 108, and a microcontroller 110. The optical navigation device 102 also includes optical elements 112 and 114, and a mask or filter 116. Other embodiments may include fewer or more components. For example, some embodiments of the optical navigation device 102 may exclude one or more of the optical elements 112 and 114, while other embodiments include additional optical elements. In another embodiment, a single optical element may be used for optical control in both the illumination and imaging light paths. As other examples, some embodiments of the optical navigation device 102 may exclude the mask or filter 116, or may include multiple masks or filters.

In one embodiment, the light source 106 is an incoherent light source. In another embodiment, the light source 106 is a coherent light source. In one embodiment, the light source 106 is a laser. For example, the light source 106 may be a vertical cavity surface emitting laser (VCSEL) or a light emitting diode (LED). Alternatively, the light source 106 may be another type of laser or other light source. In some embodiments, the light emitted by the light source 106 is collimated. In other embodiments, the light source 106 emits light that is not collimated.

In general, the light source 106 directs light toward the navigation surface 104 to illuminate a portion of the navigation surface 104. The incident light (i.e., the light traveling toward the navigation surface 104) may pass through the optical element 112. Similarly, the reflected light beam (i.e., the light reflected from the navigation surface 104) may pass through the optical element 114. Additionally, the light from the optical element 114 passes through the mask or the filter 116. Specific functionality of the optical elements 112 and 114 and the mask 116 is described in more detail below.

The depicted optical navigation circuit 108 includes an image acquisition system (IAS) 120, a digital signal processor (DSP) 122, and a driver 124. In one embodiment, the driver 124 of the optical navigation circuit 108 controls the operation of the light source 106 (e.g., using a driver signal) to generate the light beam that is emitted toward the navigation surface 104. At least some of the light at the navigation surface 104 is reflected back into the optical navigation device 102, for example, when a user's finger is near or in direct physical contact with the navigation surface 104.

In some embodiments, the optical navigation device 102 includes an optical element 114. The optical element 114 produces an optical effect on the light. The depicted image acquisition system 120 includes an image sensor 126 and an analog-to-digital converter (ADC) 130. The image sensor 126 includes a pixel array 128 of distinct photosensors, or photodetectors. Each photosensor is referred to as a picture element (pixel). As an example, the image sensor 126 may include a 16×16 or 32×32 array of distinct photodetectors configured to detect light that is reflected from the navigation surface 104. However, the image sensor 126 does not need to be an array organized by a power of two.

In one embodiment, the image sensor 126 generates a plurality of electrical signals corresponding to light intensity of the reflected light at the pixel array 128. Each of the electrical signals corresponds to one of the picture elements (or pixels) of the pixel array 128. At least a portion of the light beam reflected from the navigation surface 104 is incident on the pixel array 128. Under certain conditions, the reflected light forms a speckle pattern at the pixel array 128. The average size of the speckles depends in part on the length of the optical path between the navigation surface 104 and the pixel array 128.

Image information is captured by the pixel array 128 of the image sensor 126 in sensor-specific frames. A frame of image information includes a set of simultaneously captured values for each distinct photosensor in the pixel array 128. Image frames captured by the pixel array 128 include data that represents features on the navigation surface 104. The rate of image frame capture and tracking resolution can be programmable.

The analog-to-digital converter (ADC) 130 converts the plurality of electrical signals, received from the pixel array 128 of the image sensor 126, from analog signals to digital signals (e.g., 8-bit digital values). The analog-to-digital converter 130 then passes the digital signals to the digital signal processor 122.

A tracking engine (not shown) within the digital signal processor 122 compares successive image frames from the pixel array 128 to determine the movement of image features between frames. In particular, the tracking engine determines movement by correlating common features that exist in successive image frames generated by the pixel array 128. The movement between image frames is expressed in terms of movement vectors in, for example, X and Y directions (e.g., $\Delta x$ and $\Delta y$). The movement vectors are then used to determine the relative movement at the tracking surface (e.g., the movement of a user's finger relative to the navigation surface 104 or, alternatively, the relative movement of the optical navigation device 102 relative to the navigation surface 104.

After the digital signal processor 122 receives the digital form of the electrical signals from the analog-to-digital converter 130 of the image acquisition system 120, the digital signal processor 122 may perform additional processing using the digital signals. The digital signal processor 122 then transmits one or more signals to the microcontroller 110. Examples of types of signals transmitted from the digital signal processor 122 of the optical navigation circuit 108 to the microcontroller 110 include channel quadrature signals based on $\Delta x$ and $\Delta y$ relative displacement values. These signals, or other signals, may be indicative of a movement of the optical navigation device 102 relative to the navigation surface 104.

Alternatively, the quadrature or other signals may be indicative of a movement of the optical navigation device 102 relative to a distant object or surface in a free space navigation environment. Other embodiments of the digital signal processor 122 may transmit other types of signals to the microcontroller 110. In one embodiment, the microcontroller 110 implements a variety of functions, including transmitting data to and receiving data from a host computer system (not shown).

FIG. 2 depicts a schematic diagram of one embodiment of an optical navigation arrangement 140 for use in the optical navigation system 100 of FIG. 1. The illustrated optical navigation arrangement 140 includes the light source 106, an optical element 142, and the image sensor 126. In some embodiments, the optical element 142 is representative of one or both of the optical elements 112 and 114 illustrated within the optical navigation device 102 of FIG. 1. Other embodiments of the optical navigation arrangement 140 may include fewer or more components.

In the illustrated embodiment, the navigation surface 104 is a surface portion of the optical element 142. The navigation surface 104 may be a surface portion that is explicitly demarcated or implicitly identified by way of the installation of the optical element 142 with the optical navigation device 102.

The optical element 142 includes a first redirection surface 144 and a second redirection surface 146 that, in the illustration of FIG. 2, are at opposite ends of the structure. In operation, the redirection surfaces 144 and 146 operate to redirect the light within the optical element through partial internal reflection, total internal reflection (TIR), or reflection from a coating or material applied to one or both of the redirection surfaces 144 and 146 (see FIG. 7). In operation, the light source 106 generates illumination (shown dashed) in the direction of the navigation surface 104. Although not shown, additional optical elements may be used to make this light collimated, diverging, or converging, depending on the application. The light incident at the navigation surface 104 may be partially reflected and partially transmitted in the absence of a finger 148 or other object at the navigation surface 104. When a user's finger 148 or other navigation object is present at the navigation surface, a greater portion of the incident light is reflected back into optical element 142 toward the first redirection surface 144. The light is then partially or totally reflected at the first redirection surface 144 toward the second redirection surface 146 which, in turn, partially or totally reflects the light toward the pixel array 128 of the image sensor 126. This path is generally depicted by the dashed lines shown within the optical element 142. It should be noted that the shape of the illustrated optical element 142 is merely a depiction of one example, and other embodiments may use different shapes and/or sizes. Also, the references to redirection "surfaces" do not imply that the light is incident on a particular side of the surface interface, but merely indicates that there is a surface interface at which light is redirected.

FIG. 2 also depicts planes 148 and 150 (shown dashed) that approximately correspond to the navigation surface 104 and the pixel surface of the image sensor 126. These planes 148 and 150 are illustrated to facilitate discussion of the distances or length of different optical paths. FIG. 3A depicts a schematic diagram of one embodiment of a distance, d, between the navigation surface 104 and the image sensor 126. The distance, d, between the navigation surface 104 and the image sensor 126 represents a distance or length of the optical path of the light reflected at the navigation surface 104 and ultimately detected at the image sensor 126.

In many conventional devices, the distance, d, is representative of substantially straight, or non-folded, optical path of the reflected light because the light is not typically redirected between the navigation surface 104 and the image sensor 126. With reference to the planes 148 and 150 shown in FIG. 2, the non-folded optical path of the reflected light for a conventional device may be approximately equivalent to the orthogonal distance between the two planes 148 and 150. Since the optical path of the reflected light is non-folded, and the distance of the optical path at least partially determines the speckle sizes at the image sensor, conventional devices are typically made thicker, with a greater distance, d, between the planes 148 and 150 so that an adequate speckle size can be detected.

In contrast to conventional devices, the length or distance, d, of the optical path of the reflected light is much longer, or greater than, than the orthogonal distance between the planes 148 and 150. Rather, the distance, d, of the optical path of the reflected light through the optical element 142 may be significantly longer due to the additional travel through the length (approximately horizontal in FIG. 2) of the optical element. This is a result of the redirected, or folded, path of the light through the optical element 142. In some embodiments, the optical path through the optical element 142 is greater than about twice the orthogonal distance between the planes 148 and 150. In other embodiments, the optical path through the optical element 142 is between about three to five times the orthogonal distance between the planes 148 and 150. In other embodiments, the optical path through the optical element 142 is greater than about five times the orthogonal distance between the planes 148 and 150.

Other embodiments may use other sizes of optical elements 142 to provide an optical path with a folded distance, d, that is sufficient to produce an average speckle size that is greater than a threshold for the pixel size of the image sensor 126. FIG. 3B depicts a schematic diagram of one embodiment of a speckle pattern 152 produced on a pixel 154 of the image sensor 126. For reference, the pixel pitch, p, is shown relative to the size of the illustrated speckle pattern 152. In general, the speckle pattern 152 may include various shapes, sizes, and colors or tones of speckles, or spots. The characteristics and spatial relationship of the speckles within the speckle pattern 152 depend on many factors, including the properties and distribution of the light that is reflected from the navigation surface 104 of the optical element 142.

In some embodiments, the distance, d, of the optical path may be tailored to provide an average speckle size that is approximately one order of magnitude smaller than the pixel pitch, p, of the image sensor 126. In another embodiment, the distance, d, of the optical path may be tailored to provide an average speckle size that is approximately one half (or greater) than the pixel pitch, p, of the image sensor 126. Other embodiments may use optical elements of different sizes in order to generate speckle patterns with other sizes (relative to the pixel pitch, p) and/or characteristics.

Figure 4:
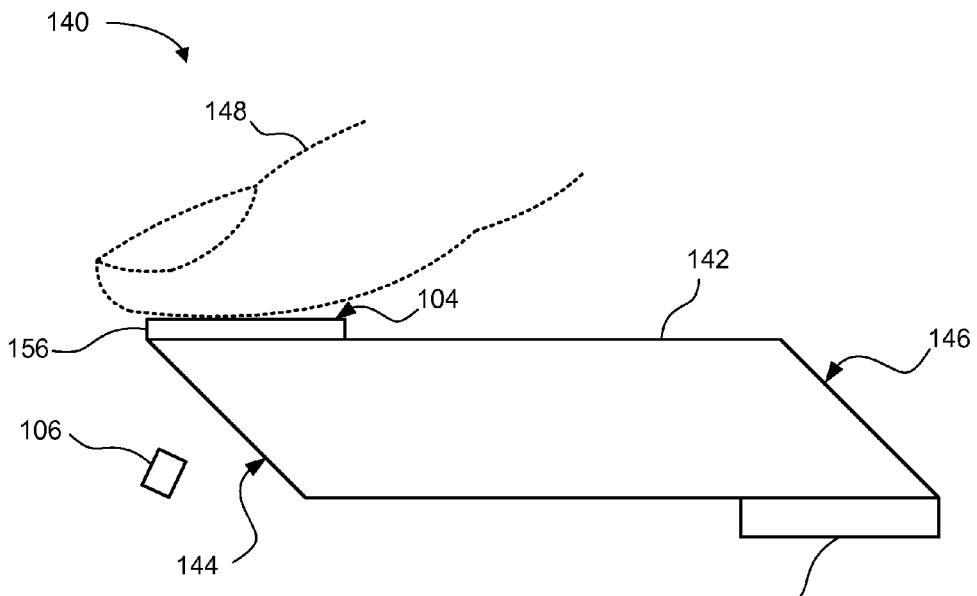
FIG. 4 depicts a schematic diagram of another embodiment of the optical navigation arrangement of FIG. 2 including a separate navigation surface structure.

FIG. 4 depicts a schematic diagram of another embodiment of the optical navigation arrangement 140 of FIG. 2 including a separate navigation surface structure 156. In the illustrated embodiment, the separate navigation surface structure 156 may provide a protective layer over the corresponding portion of the optical element 142. In some embodiments, the separate navigation surface structure 156 may have identical or similar optical properties to the optical element 142.

Figure 5:
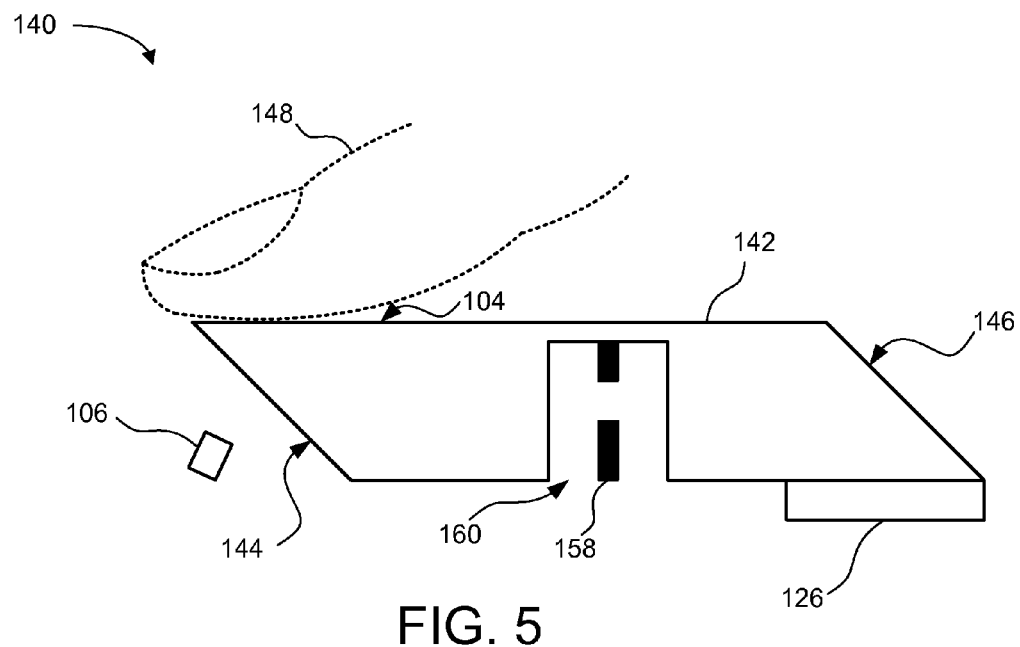
FIG. 5 depicts a schematic diagram of another embodiment of the optical navigation arrangement of FIG. 2 including an aperture disposed within a cavity formed in the optical element.

FIG. 5 depicts a schematic diagram of another embodiment of the optical navigation arrangement 140 of FIG. 2 including an aperture 158 disposed within a cavity 160 formed in the optical element 142. In the depicted embodiment, the cavity 160 is formed within the bottom of the optical element 142, although other embodiments may use various cavity configurations. For example, the cavity may be formed in the bottom surface, the top surface, or one of the side surfaces, or a combination of various surfaces.

The aperture 158 is disposed within the cavity 160 in order to further control one or more characteristics of the light detected at the image sensor 126. For example, in one embodiment, the aperture 158 controls the average, minimum and/or maximum speckle size of the speckle pattern 152 detected at the image sensor 126. In another example, the aperture 158 controls the contrast ratio of the resulting speckle pattern 152 detected at the image sensor 126. Other embodiments of the aperture 152 may control or influence other characteristics of the light detected at the image sensor 126.

The cavity 160 in which the aperture is disposed may be of various shapes and/or sizes. In one embodiment, the shape and size of the cavity 160 approximately matches the shape and size of the aperture 158 so that there is little clearance between at least one of the outer dimensions of the aperture 158 and a corresponding interior surface of the cavity 160. In other embodiments, the cavity 160 is substantially larger than the aperture 158 so that there is adequate clearance to adjust the position of the aperture 158 within the cavity in one or more dimensions. Also, the walls of the cavity 160 may be any shape or angle. In some embodiments, the walls of the cavity 160 are concave or convex surfaces, thus adding optical power (or magnification) to the optical element. Although the optical power may not have a substantial effect, if any, on the speck properties, the optical power properties of the walls of the cavity 160 may be helpful in imaging normal features from the navigation surface 104 to the image sensor 126. In a further embodiment, the optical navigation circuit 108 may switch between different imaging modes. For example, for highly diffuse surfaces, the optical navigation circuit 108 may operate predominantly or totally in a speckle navigation mode. For less diffuse surfaces, the optical navigation circuit 108 may operate predominantly or totally in a feature navigation mode, which may be at least partially facilitated by the optical properties of the walls of the cavity 160.

Figure 6A:
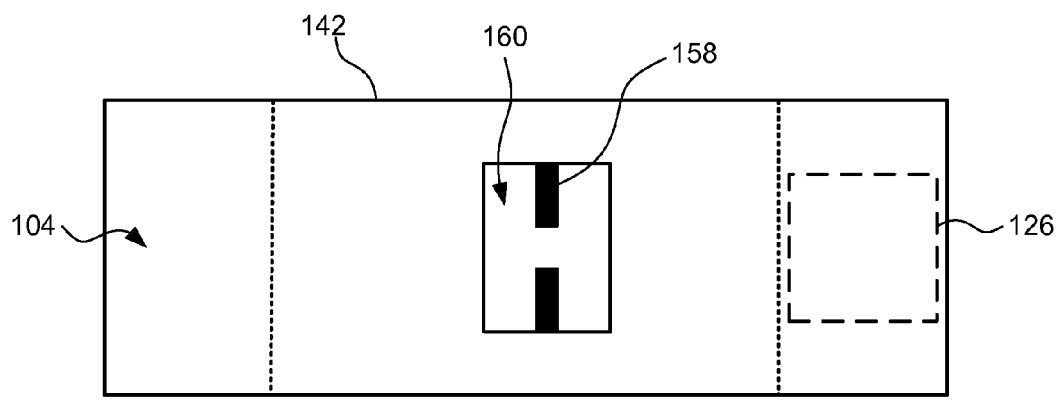
FIG. 6A depicts a top view of another embodiment of the optical element and the aperture disposed within the cavity formed in the optical element.
Figure 6B:
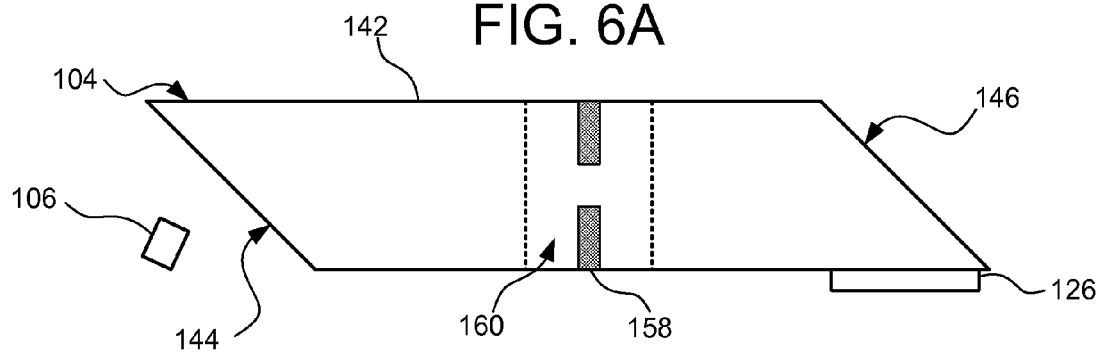
FIG. 6B depicts a side view of the optical element and the aperture disposed within the cavity formed in the optical element.

FIG. 6A depicts a top view of another embodiment of the optical element 142 and the aperture 158 disposed within the cavity 160 formed in the optical element 142. As opposed to the cavity being formed with access solely from the bottom and/or sides of the optical element 142, as illustrated in FIG. 5, the cavity 160 of the optical element 142 of FIG. 6 penetrates through the thickness of the optical element 142. FIG. 6B depicts a side view of the optical element 142 and the aperture 158 disposed within the cavity 160 formed in the optical element 142. More specifically, the dashed lines shown around the aperture 158 in FIG. 6B represent the cavity 160 extending from the bottom surface to the top surface of the optical element 142. By having sidewall connections on one or both sides of the cavity 160, potential assembly error and/or tolerances may be controlled and, in some embodiments, reduced or minimized because the relative locations of the redirection surfaces 144 and 146 are fixed. Other embodiments may implement other variations of cavities 160 to accommodate one or more apertures 158. In further embodiments, the optical element 142 may include multiple cavities that are completely separate or partially joined to accommodate multiple apertures 158 and/or other optical elements.

Figure 7:
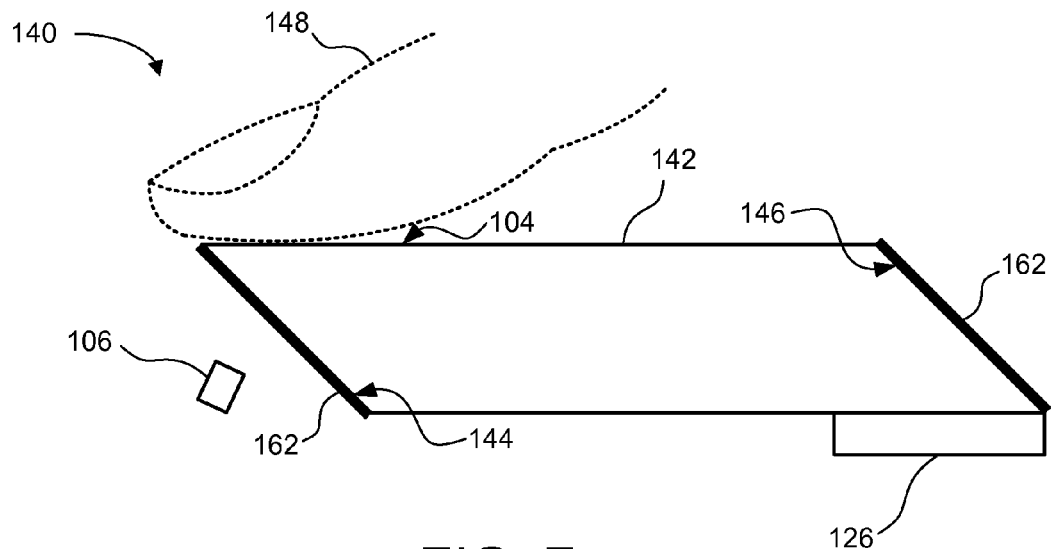
FIG. 7 depicts a schematic diagram of another embodiment of the optical navigation arrangement of FIG. 2 including reflective material disposed at the redirection surfaces of the optical element.

FIG. 7 depicts a schematic diagram of another embodiment of the optical navigation arrangement 140 of FIG. 2 including reflective material 162 disposed at the redirection surfaces 144 and 146 of the optical element 142. Various types of reflective material 162 may be used. As one example, the reflective material 162 may include a thin metallic layer. As another example, the reflective material 162 may include one or several very thin layers of dielectric material. Also, the reflective material 162 may be disposed on the redirection surfaces 144 and 146 in various ways. For example, a metallic layer or a metal coating could be disposed on one or both of the redirection surfaces 144 and 146 using sputter coating or vacuum deposition coating. A multi-layer dielectric film may be formed using different thin film deposition techniques (chemical or physical deposition). In some embodiments, the reflective material 162 is totally reflective, while in other embodiments, the reflective material 162 at one or both of the redirection surfaces 144 and 146 may be only partially reflective. For example, the reflective material 162 at the first redirection surface 144 may be partially reflective and partially transmissive so that light from the light source 106 may transmit through the reflective material 162 to enter the optical element and propagate toward the navigation surface 104. The light reflected and scattered from the navigation surface 104 then is at least partially reflected by the reflective material 162 to redirect the reflected light within the optical element 142 toward the second redirection surface 146. In some applications, the multi-layer thin film filter on redirection surface 144 could be designed to have different transmission and reflection properties for the light from the light source 106 and the light reflected and scattered from surface 104.

Figure 8A:
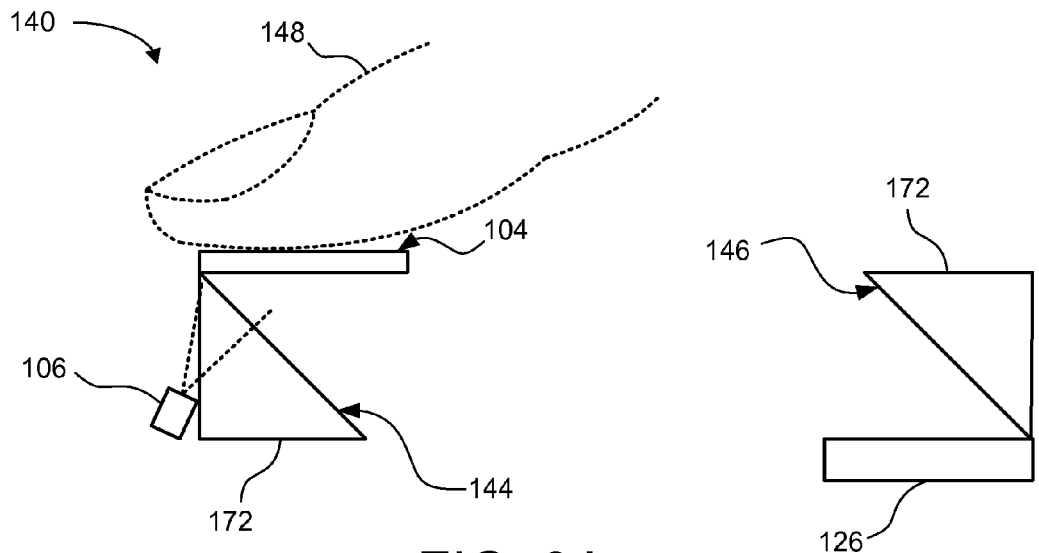
FIG. 8A depicts a schematic diagram of another embodiment of the optical navigation arrangement of FIG. 2 including an optical element with an air gap between the redirection surfaces.

FIG. 8A depicts a schematic diagram of another embodiment of the optical navigation arrangement 140 of FIG. 2 including an optical element 172 with an air gap 174 between the redirection surfaces 144 and 146. As shown, the optical element 172 actually may be an arrangement of multiple pieces that are not physically in contact with each other. Alternatively, the arrangement of multiple pieces may include one or more physical structures which connect between the end pieces. In the illustrated embodiment, a separate navigation surface 104 is provided. However, the navigation surface 104 may be formed as an integral piece with the end piece which includes the first redirection surface 144. By using the optical element 172 with the air gap 174 between the redirection surfaces 144 and 146, it may be possible to obtain a higher signal to noise ratio or a higher integrity of the reflected light because the air gap 174 may have better transmission characteristics and/or uniformity compared with some types of optical materials that may be used to form, for example, the optical element 142 shown in previous figures. In other embodiments, the use of an air gap 174, instead of a filler material, between the redirection surfaces 144 and 146 may have other effects on the detected light. For example, the effective total distance of the optical path may be different for air gap 174 than for another filler material. For another filler material having a refractive index, n, the total effective distance of the optical path will be approximately the actual distance multiplied by the refractive index, n, of the filler material, which may allow the overall dimensions of the optical element 142 to be smaller relative to an optical element that has an air gap 174 between the redirection surfaces 144 and 146. Also, in some embodiments, the use of a filler material may impact, and in some cases enhance, the contrast of the speckles within the speckle pattern 152 that is detected by the image sensor 126.

Figure 8B:
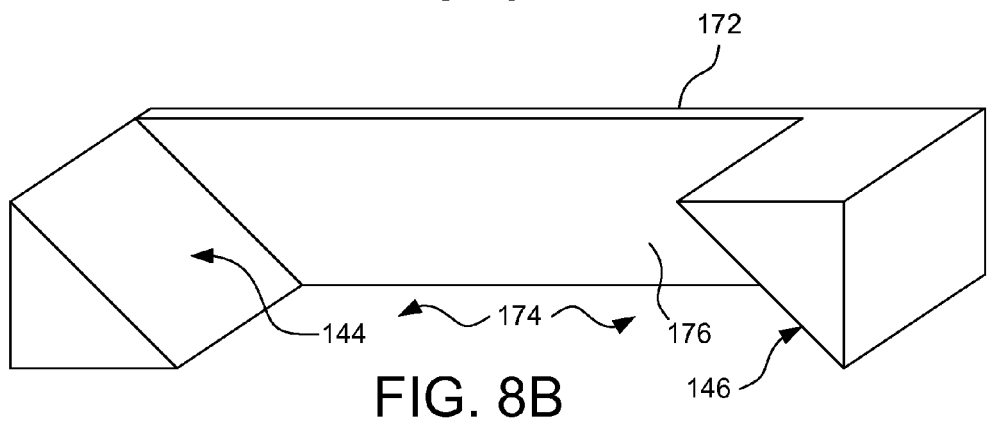
FIG. 8B depicts a schematic diagram of another embodiment of the optical element of FIG. 8A including a structural member to maintain the redirection surfaces in fixed positions relative to each other.

FIG. 8B depicts a schematic diagram of another embodiment of the optical element 172 of FIG. 8A including a structural member 176 to maintain the redirection surfaces 144 and 146 in fixed positions relative to each other. In the illustrated embodiment, the structural member 176 spans the height of the end pieces and the length of the air gap 174. Other embodiments may use different shapes, sizes, and/or quantities of the structure member(s) 176. For example, in some embodiments, the optical element 172 is mounted on a separate physical structure to provide additional structural support for the optical element 172.

Figure 8C:
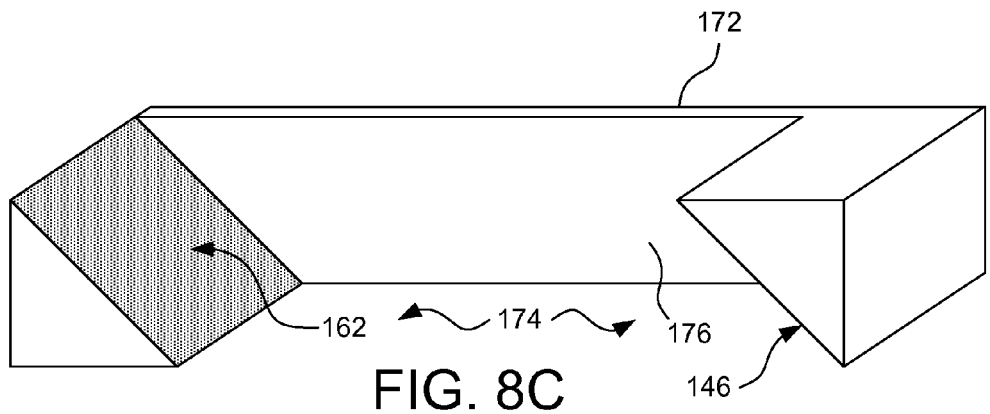
FIG. 8C depicts a schematic diagram of another embodiment of the optical element of FIG. 8B including a reflective material applied to at least one of the redirection surfaces.

FIG. 8C depicts a schematic diagram of another embodiment of the optical element 172 of FIG. 8B including a reflective material 162 applied to at least one of the redirection surfaces 144 and 146. Although the reflective material 162 only shown at the first redirection surface 144, the reflective 162 also may be applied to the second redirection surface 146. In some embodiments, the reflective material 162 also may be applied to some or all of the structural member(s) 176 which span the air gap 174 between the redirection surfaces 144 and 146.

Figure 9:
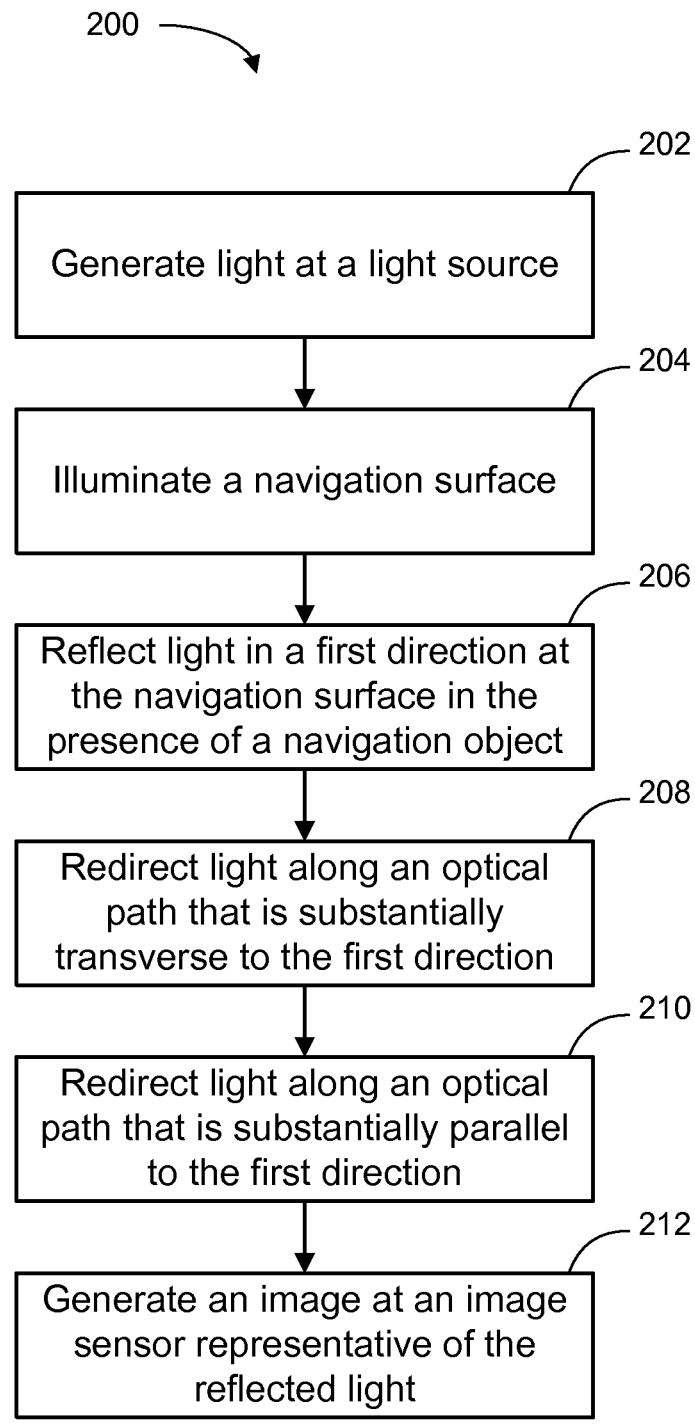
FIG. 9 depicts a flow chart diagram of one embodiment of a method for operating an optical finger navigation device such as the optical navigation device of FIG. 1.

FIG. 9 depicts a flow chart diagram of one embodiment of a method 200 for operating an optical finger navigation device such as the optical navigation device 102 of FIG. 1. Although the method 200 is described in conjunction with the optical navigation device 102 of FIG. 1, embodiments of the method 200 may be implemented with other types of optical navigation devices.

At block 202, the light source 106 generates light. The light is emitted toward the navigation surface 104 and, at block 204 the light illuminates the navigation surface 104. When a finger or other navigation object is present at the navigation surface 104, at block 206 the light is reflected in a first direction from the navigation surface 104 toward the first redirection surface 144. At block 208, the light reflects at the first redirection surface 144 and is redirected along an optical path in a second direction that is substantially transverse to the first direction of the reflected light. As one example, if the light is originally reflected at the navigation surface 104 in a vertical direction, then the light is generally reflected at the first redirection surface 144 in a horizontal direction.

At block 210, the light reflects at the second redirection surface 146 and is redirected in a third direction toward the image sensor 126. The third direction of the reflected light is approximately parallel to the first direction of the reflected light (and approximately transverse to the second direction). At block 212, the image sensor 212 detects the light and facilitates generation of an image representative of the reflected light. More specifically, the image sensor 126 generates an image that is representative of the speckle pattern 152 generated at the image sensor 126. The depicted method 200 then ends.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of optical navigation devices implemented using the optical elements 142 described herein, or equivalent variations thereof, facilitate the production of relatively thin devices that may be incorporated more easily into digital devices that have a small form factor. For example, an embodiment of the optical navigation device 102 described herein may be incorporated as an optical finger navigation device into a portable telephone. In an example of one arrangement, a small molded plastic part may be used as the optical element 142 to deflect the light coming from the navigation surface 104 using the total internal reflection (TIR) at the angled, or tilted, redirection surfaces 144 and 146. For some alternative designs, the redirection surfaces 144 and 146 could be partially or completely coated with a metallic layer to enhance the reflection properties of the redirection surfaces 144 and 146. The reflected light propagates through the length of the optical element 142 approximately parallel to the navigation surface 104. As one example, the thickness of the optical element 142 (i.e., between the planes 148 and 150 of FIG. 1) may be approximately 1 mm (or between about 0.2 and 2.0 mm), and the length of the optical element 142 may be a few millimeters (or between about 2.0 and 20.0 mm or more). The additional length of the optical element 142 increase the optical path of the light by a factor of about 3 (or between about 2-5) times the thickness of the optical element 142.

Furthermore, in certain embodiments, the length of the optical element 142 compensates for the relatively thin vertical dimension of the optical element 142 to allow an image sensor 126 with a relatively large pixel pitch (e.g., 30 micrometers) to adequately detect a speckle pattern. In one embodiment, the length of the optical element 142 is established to facilitate a combination which includes: 1) a relatively thin distance between the planes of the tracking surface and the image sensor of about one millimeter or less; 2) a pixel pitch of about thirty micrometers or more; and 3) a speckle size produced at the image sensor 142 that is about one tenth of the pixel pitch or more. In this way, an image sensor with a relatively larger pixel pitch may be effectively utilized within a device that have a relatively thin form factor that otherwise might not accommodate (i.e., function effectively with) the image sensor with the larger pixel pitch.

Embodiments which implement this technique, or an equivalent variation thereof, can increase the effective optical distance from the navigation surface 104 to the image sensor 126 and, consequently, control the design of a proper speckle size and contrast ratio for the speckle pattern 152 formed on any given pixel pitch/size. In addition to the extended optical light path obtained by embodiments and designs described herein, some embodiments may include an aperture 158 (e.g., disposed within a corresponding cavity 160) to further modify the size of the speckles per design constraints.

It also may be noted that there are several parameters such as the laser wavelength, the laser location and chief ray direction, the tilt angles of the redirection surfaces 144 and 146, the refractive index of the plastic material used for the optical element 142, the dimensions of the plastic material, the size of the illumination spot, the size of the image sensor 126, the pixel pitch and size, the location of the aperture 158, and the shape and size of the aperture 158, which can each be selected based on the design constraints of a particular implementation. Hence, these and other design parameters and are not limited in the general embodiments described herein.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical finger navigation device comprising:
   an image sensor to generate an image representative of light detected at a pixel array, wherein the pixel array has a pixel pitch which at least partially defines a surface area of a pixel;
   a tracking surface that is approximately parallel to the image sensor, wherein a first distance between and substantially orthogonal to planes of the tracking surface and the image sensor is insufficient under a set of illumination constraints to produce at the image sensor a speckle size above a threshold, wherein the threshold is approximately one order of magnitude less than the pixel pitch; and
   an optical element interposed between the tracking surface and the image sensor, wherein the optical element comprises at least one optical redirection surface to redirect light along an optical path of a second distance between the tracking surface and the image sensor, wherein the second distance is sufficient under the set of illumination constraints to produce at the image sensor a speckle size of at least the threshold.

2. The optical finger navigation device of claim 1, wherein the optical element comprises a single piece of optical material shaped to have the optical redirection surface at a first end and a second optical redirection surface at a second end.

3. The optical finger navigation device of claim 2, wherein the optical element is configured to redirect the light along the optical path within the optical material at least partially using total internal reflection.

4. The optical finger navigation device of claim 2, further comprising a reflective material applied to the redirection surface at the first end and to the second redirection surface at the second end, wherein the reflective material is configured to reflect light internally within the optical material.

5. The optical finger navigation device of claim 2, wherein the optical material defines a cavity configured for insertion of an aperture stop, wherein the aperture stop comprises a light absorbing material with a hole through the light absorbing material, wherein the hole is aligned with the optical path of the light to pass a selected portion of the redirected light and to block a remaining portion of the redirected light.

6. The optical finger navigation device of claim 1, wherein the optical element comprises at least two optical redirection surfaces with an air gap extending between the at least two optical redirection surfaces.

7. The optical finger navigation device of claim 6, further comprising an aperture stop positioned within the air gap between the at least two optical redirection surfaces, wherein the aperture stop comprises a light absorbing material with a hole through the light absorbing material, wherein the hole is aligned with the optical path of the light to pass a selected portion of the redirected light and to block a remaining portion of the redirected light.

8. The optical finger navigation device of claim 1, wherein the optical path along the second distance is at least two times longer than the first distance between the planes of the tracking surface and the image sensor.

9. A method for operating an optical finger navigation device, the method comprising:
   generating light at a light source to illuminate a tracking surface, wherein the tracking surface is approximately parallel to an image sensor having a pixel array with a pixel pitch, wherein a first distance between and substantially orthogonal to planes of the tracking surface and the image sensor is insufficient under a set of illumination constraints to produce at the image sensor a speckle size above a threshold, wherein the threshold is approximately one order of magnitude less than the pixel pitch;
   redirecting light via an optical element interposed between the tracking surface and the image sensor, wherein the light is redirected along an optical path of a second distance between the tracking surface and the image sensor, wherein the second distance is sufficient under the set of illumination constraints to produce at the image sensor a speckle size of at least the threshold; and
   generating an image at the image sensor, wherein the image is representative of light detected at the pixel array.

10. The method of claim 9, wherein redirecting the light via the optical element further comprises:
    internally reflecting the light from the tracking surface within the optical element at the redirection surface at a first end of the optical element approximately in a first direction parallel to the planes of the tracking surface and the image sensor;
    internally reflecting the light from the first direction within the optical element at a second optical redirection surface at a second end of the optical element approximately in a second direction toward the image sensor.

11. The method of claim 10, wherein internally reflecting the light within the optical element comprises reflecting the light off of a reflective material applied to a corresponding outer surface of the optical element.

12. The method of claim 10, further comprising passing at least a portion of the redirected light through an aperture stop interposed between the redirection surface and the second redirection surface, wherein the aperture stop comprises a light absorbing material with a hole through the light absorbing material.

13. The method of claim 9, wherein redirecting the light via the optical element further comprises:
    reflecting the light from the tracking surface off of a first exposed surface of the optical element approximately in a first direction parallel to the planes of the tracking surface and the image sensor; and
    reflecting the light from the first direction off of a second exposed surface of the optical element approximately in a second direction toward the image sensor.

14. The method of claim 13, further comprising passing at least a portion of the redirected light through an aperture stop interposed between the first and second exposed surfaces of the optical element, wherein the aperture stop comprises a light absorbing material with a hole through the light absorbing material.

15. The method of claim 9, wherein redirecting the light via the optical element further comprises redirecting the light along the second distance which is at least two times longer than the first distance.

* * * * *